US009497753B2

(12) United States Patent
Seo et al.

(10) Patent No.: US 9,497,753 B2
(45) Date of Patent: Nov. 15, 2016

(54) METHOD AND APPARATUS FOR RECEIVING CONTROL INFORMATION THROUGH EPDCCH IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 14 days.

(21) Appl. No.: 14/407,546

(22) PCT Filed: Jun. 12, 2013

(86) PCT No.: PCT/KR2013/005194
§ 371 (c)(1),
(2) Date: Dec. 12, 2014

(87) PCT Pub. No.: WO2013/187694
PCT Pub. Date: Dec. 19, 2013

(65) Prior Publication Data
US 2015/0139109 A1 May 21, 2015

Related U.S. Application Data

(60) Provisional application No. 61/658,899, filed on Jun. 12, 2012.

(51) Int. Cl.
*H04W 72/04* (2009.01)
*H04L 5/00* (2006.01)
(52) U.S. Cl.
CPC .......... *H04W 72/042* (2013.01); *H04L 5/0053* (2013.01); *H04L 5/0048* (2013.01); *H04L 5/0094* (2013.01)

(58) Field of Classification Search
CPC ......... H04W 72/042; H04W 72/0406; H04W 48/00; H04L 5/00; H04L 5/0051; H04L 5/0053; H04L 5/0026; H04L 5/0091; H04L 5/0094; H04L 5/0048; H04L 5/14
USPC ................................ 370/328, 329, 331–392
See application file for complete search history.

(56) References Cited

U.S. PATENT DOCUMENTS

2013/0301549 A1\* 11/2013 Chen .................... H04W 76/048
370/329
2013/0301561 A1\* 11/2013 Sartori .................. H04W 72/04
370/329

(Continued)

OTHER PUBLICATIONS

NEC Group, "ePDCCH search space design," 3GPP TSG RAN WG1 Meeting #69, R1-122595, Prague, Czech Republic, May 21-25, 2012 (Discussion).\*

(Continued)

*Primary Examiner* — Afsar M Qureshi
(74) *Attorney, Agent, or Firm* — Birch, Stewart, Kolasch & Birch, LLP

(57) ABSTRACT

A method and user equipment (UE) are provided for receiving control information through an enhanced physical downlink control channel (EPDCCH) in a wireless communication system. The UE indexes resource elements (REs) included in a physical resource block (PRB) set of a received subframe with 'n' enhanced resource element groups (EREGs) per PRB pair, and indexes the 'n' EREGs to 'm' enhanced control channel elements (ECCEs) per PRB pair. The UE determines an EPDCCH candidate constituting a UE-specific search space based on the 'm' ECCEs and performs blind decoding, When a size of an EREG is fixed, 'n' is determined based on a number of REs available for a PRB pair and the size of the EREG, and 'm' is determined by 'n' and a number of EREGs per ECCE.

12 Claims, 10 Drawing Sheets (a)

(b)

(56) References Cited

U.S. PATENT DOCUMENTS

| | | | |
|---|---|---|---|
| 2014/0204849 A1* | 7/2014 | Chen | H04L 5/0053 370/329 |
| 2015/0016386 A1* | 1/2015 | Tamrakar | H04L 5/0048 370/329 |
| 2015/0078326 A1* | 3/2015 | Kim | H04J 11/005 370/330 |
| 2015/0146639 A1* | 5/2015 | Seo | H04L 5/0094 370/329 |
| 2015/0215081 A1* | 7/2015 | Chae | H04L 5/0055 370/329 |
| 2015/0304994 A1* | 10/2015 | Kim | H04L 5/0048 370/280 |
| 2015/0327227 A1* | 11/2015 | Soldati | H04L 5/0053 370/330 |
| 2016/0020886 A1* | 1/2016 | Kim | H04L 5/0007 370/330 |

OTHER PUBLICATIONS

HTC, "eREG and eCCE Definitions for ePDCCH," 3GPP TSG-RAN WG1 #69, R1-122331, Prague, Czech Republic, May 21-25, 2012, pp. 1-7.

Huawei et al., "eCCE definition for ePDCCH," 3GPP TSG RAN WG1 Meeting #69, R1-121963, Prague, Czech Republican, May 21-25, 2012, pp. 1-5.

NEC Group, "ePDCCH search space design," 3GPP TSG RAN WG1 Meeting #69, R1-122595, Prague, Czech Republic, May 21-25, 2012, pp. 1-11.

Renesas Mobile Europe Ltd., "Definition of eCCE and eREG," 3GPP TSG-RAN WG1 Meeting #69, R1-122360, Prague, Czech Republic, May 21-25, 2012, pp. 1-6.

ZTE, "The definitions of eREG and eCCE," 3GPP TSG RAN WG1 Meeting #69, R1-122105, Prague, Czech Republic, May 21-25, 2012, pp. 1-5.

* cited by examiner

FIG. 6
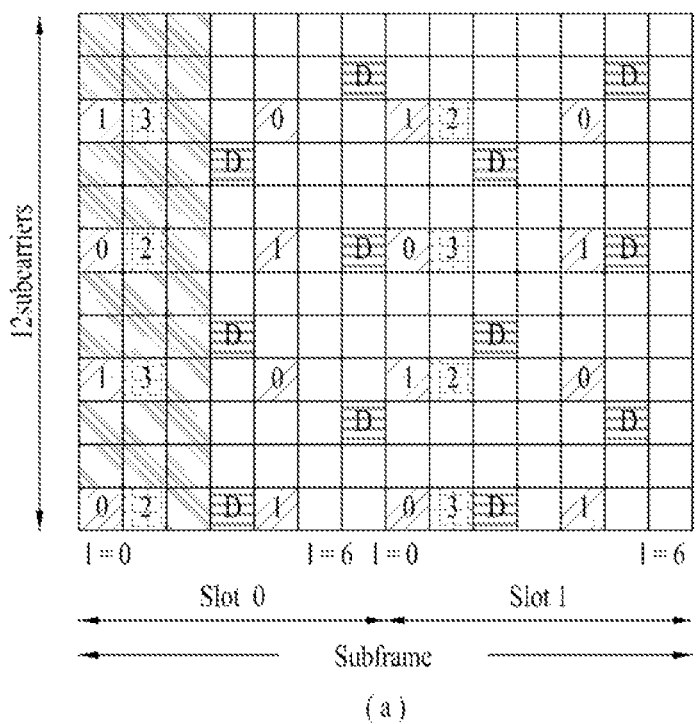
(a)
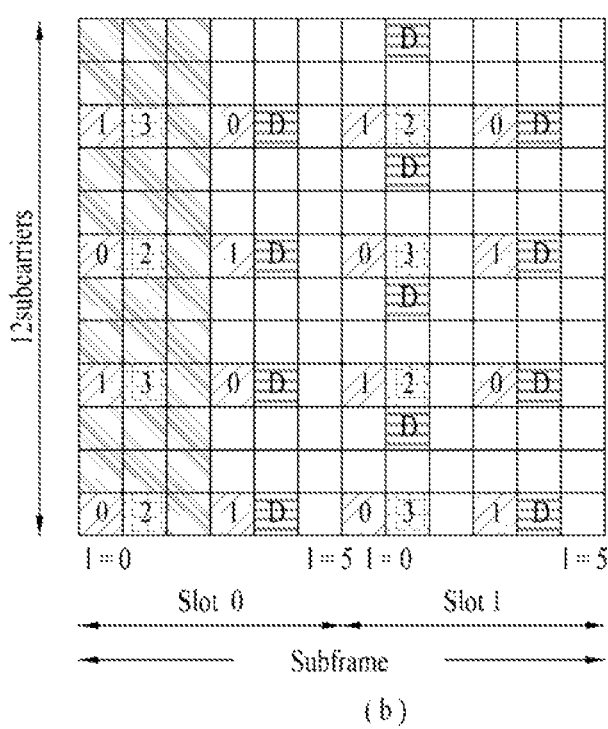
(b)

METHOD AND APPARATUS FOR RECEIVING CONTROL INFORMATION THROUGH EPDCCH IN WIRELESS COMMUNICATION SYSTEM

CROSS-REFERENCE TO RELATED APPLICATIONS

This application is the National Phase of PCT International Application No. PCT/KR2013/005194, filed on Jun. 12, 2013, which claims priority under 35 U.S.C. 119(e) to U.S. Provisional Application No. 61/658,899, filed on Jun. 12, 2012, all of which are hereby expressly incorporated by reference into the present application.

BACKGROUND OF THE INVENTION

1. Field of the Invention

This disclosure relates to a wireless communication system, and more particularly, to a method and apparatus for receiving control information through an enhanced physical downlink control channel (EPDCCH).

2. Discussion of the Related Art

Wireless communication systems are widely deployed to provide various kinds of communication services such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

An object of the present invention devised to solve the problem lies in a method for determining the number of enhanced resource element groups (EREGs) per physical resource block (PRB) pair and the number of enhanced control channel elements (ECCEs) per PRB pair in transmitting and receiving control information through an EPDCCH.

It is to be understood that technical objects to be achieved by the present invention are not limited to the aforementioned technical object and other technical objects which are not mentioned herein will be apparent from the following description to one of ordinary skill in the art to which the present invention pertains.

SUMMARY OF THE INVENTION

According to a first aspect of the present invention, provided herein is a method for receiving control information through an enhanced physical downlink control channel (EPDCCH) at a user equipment (UE) in a wireless communication system, the method comprising indexing resource elements (REs) included in a physical resource block (PRB) set of a received subframe with 'n' enhanced resource element groups (EREGs) per PRB, indexing the indexed EREGs to 'm' enhanced control channel elements (ECCEs) per PRB, and determining an EPDCCH candidate constituting a UE-specific search space based on the indexed ECCEs and performing blind decoding, wherein the number of EREGs per PRB pair 'n' is determined in consideration of at least one of the number of REs available for a PRB pair, a subframe structure and a carrier type.

According to a second aspect of the present invention, provided herein is a user equipment (UE) in a wireless communication system, comprising a receive module, and a processor, wherein the processor is configured to index resource elements (REs) included in a physical resource block (PRB) set of a received subframe with 'n' enhanced resource element groups (EREGs) per PRB, index the indexed EREGs to 'm' enhanced control channel elements (ECCEs) per PRB, and determine an EPDCCH candidate constituting a UE-specific search space based on the indexed ECCEs and perform blind decoding, wherein the number of EREGs per PRB pair 'n' is determined in consideration of at least one of the number of REs available for a PRB pair, a subframe structure and a carrier type.

The first and second aspects of the present invention may include the following details.

When a size of the EREG is fixed, the number of EREGs per PRB pair 'n' may be determined by the number of REs available for the PRB pair and the size of the EREG.

The number of ECCEs per PRB pair 'm' may be determined by 'n' and the number of EREGs per ECCE.

The number of EREGs per ECCE may be predetermined or indicated through higher layer signaling.

'n' may be determined by a following equation, $$n = \left\lfloor \frac{\text{the number of available } REs}{\text{the size of } EREG} \right\rfloor,$$

wherein the size of EREG may be the fixed size of the EREG, and the number of available REs may be the number of REs available for the PRB pair.

The number of REs available for the PRB pair may be the number of REs usable for EPDCCH transmission.

REs not corresponding to the EREGs may be used for transmit power boosting for the EREGs.

When a size of the EREG is variable, the number of EREGs per PRB pair 'n' may be determined according to the subframe structure.

The size of the EREG may be determined by the number of REs available for the PRB pair and 'n'.

The size of the EREG may be used to determine the number of EREGs per ECCE.

The size of EREG may be determined by a following equation, $$\text{the size of } EREG = \left\lfloor \frac{\text{the number of available } REs}{\text{the number of } EREG} \right\rfloor,$$

wherein the size of EREG may be 'n', and the number of available REs may be the number of REs available for the PRB pair.

The number of ECCEs per PRB pair 'm' may be determined by 'n' and the number of EREGs per ECCE.

The subframe structure may be distinguished according a to special subframe configuration.

According to embodiments of the present invention, it may be possible to flexibly address a situation in which the number of resources for EPDCCH transmission in a PRB pair is reduced, compared to a case in which the number of EREGs per PRB is predetermined.

It will be appreciated by those skilled in the art that the effects that can be achieved with the present invention are not limited to what has been described above and other advantages of the present invention will be clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 6 including (a) and (b) illustrates a reference signal;

DETAILED DESCRIPTION OF THE INVENTION

Figure 1:
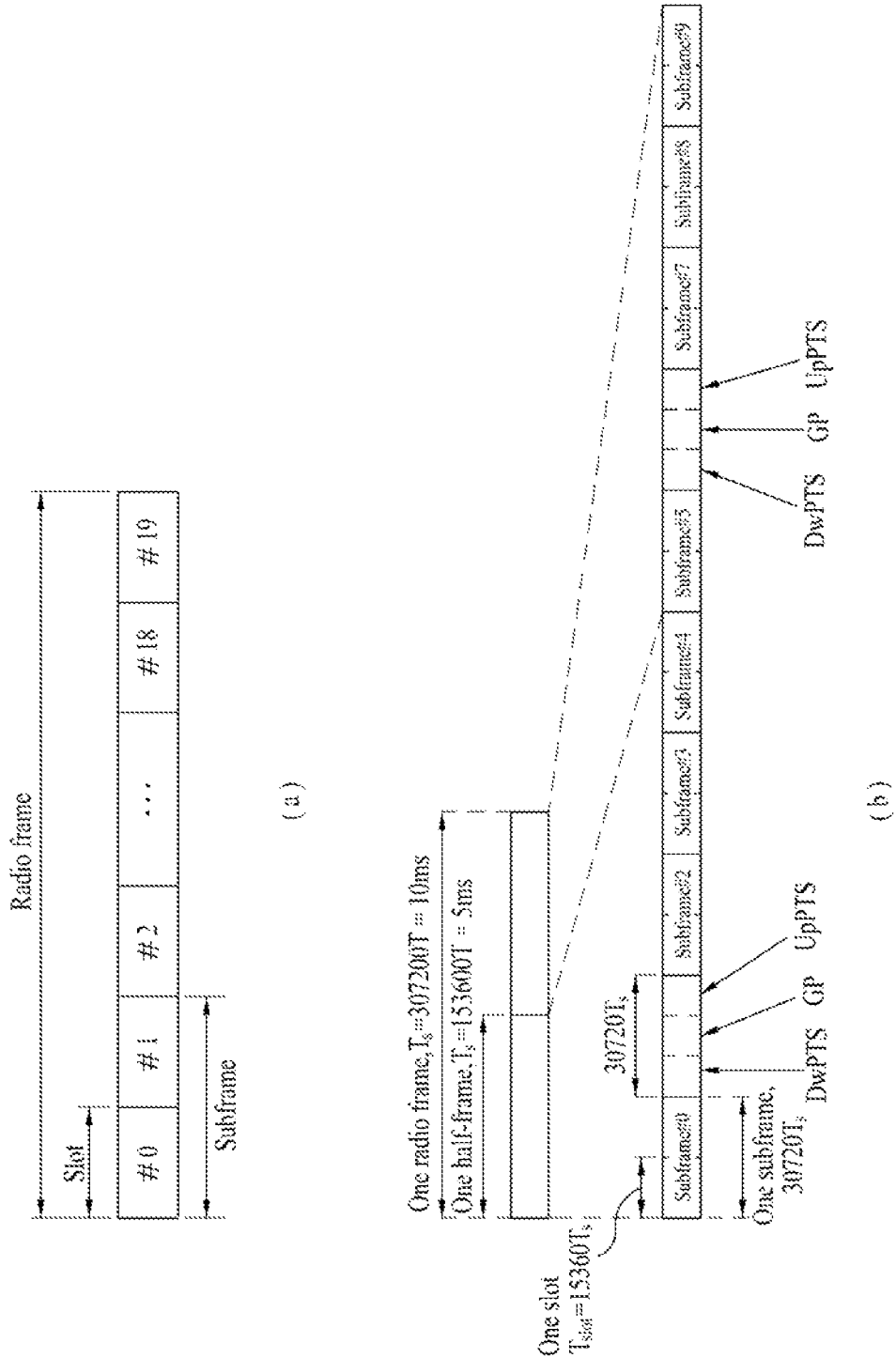
FIG. 1 including (a) and (b) illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto Hereinafter, a radio frame structure will be described with reference to FIG. 1 (a, b).

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
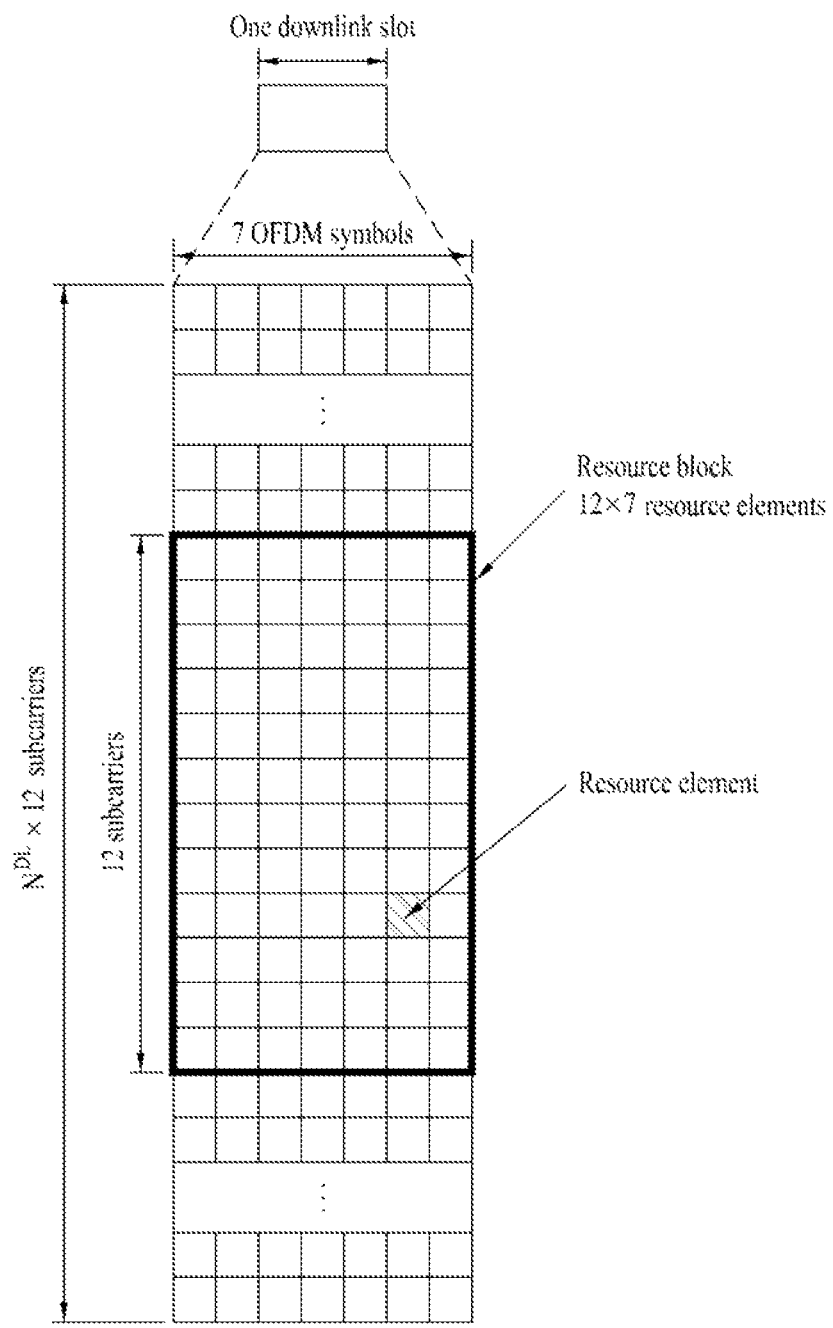
FIG. 2 is a diagram illustrating a resource grid for one downlink (DL) slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
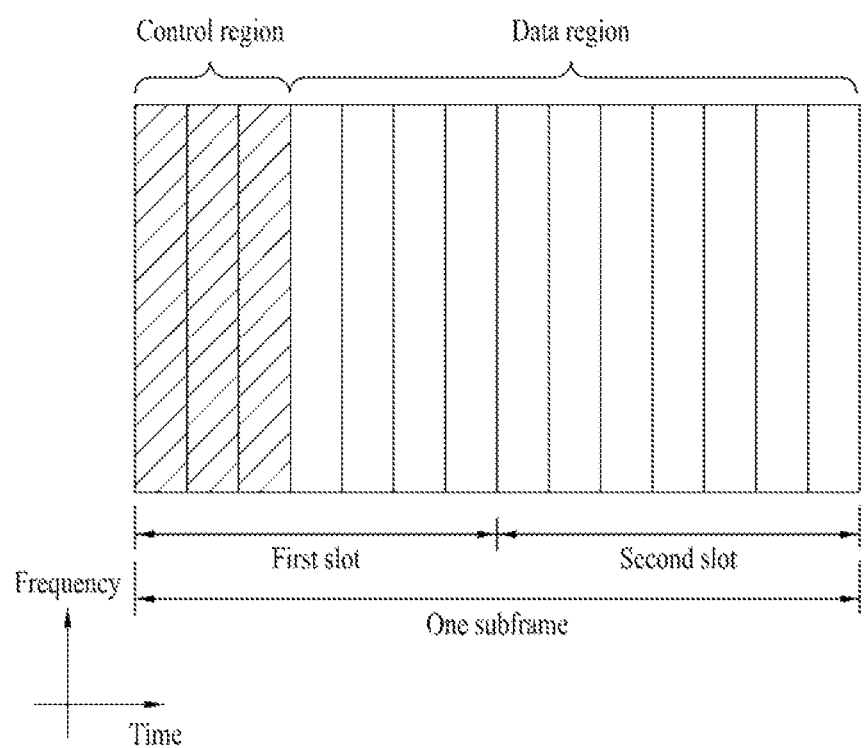
FIG. 3 is a diagram illustrating a DL subframe structure.

FIG. 3 illustrates a DL subframe structure. Up to first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
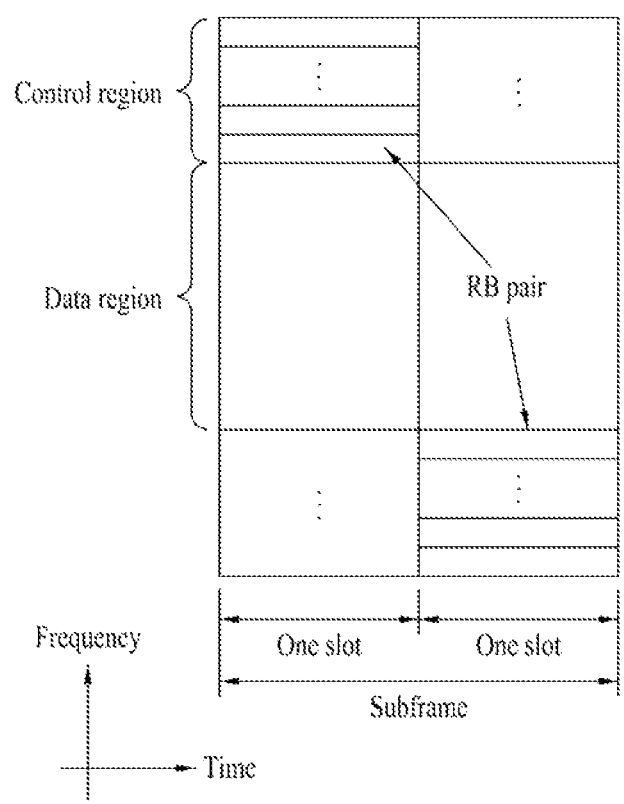
FIG. 4 is a diagram illustrating an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

DCI Format

Currently, DCI formats 0, 1, 1A, 1B, 1C, 1D, 2, 2A, 2B, 2C, 3, 3A and 4 are defined in LTE-A (Release 10). DCI formats 0, 1A, 3 and 3A are defined to have the same message size to reduce the number of times of blind decoding, which will be described later. According to purposes of control information to be transmitted, the DCI formats may be divided into i) DCI formats 0 and 4, which are used for uplink grant, ii) DCI formats 1, 1A, 1B, 1C, 1D, 2, 2A, 2B and 2C, which are used for downlink scheduling allocation, and iii) DCI formats 3 and 3A, which are for power control commands.

DCI format 0 used for uplink grant may include a carrier indicator necessary for carrier aggregation, which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data indicator used to empty a buffer for initial transmission in relation to a HARQ process, a transmit power control (TPC) command for a scheduled PUSCH, information about a cyclic shift for a demodulation reference signal (DMRS) and OCC index, and a UL index and channel quality indicator request (CSI request) necessary for a TDD operation. DCI format 0 does not include a redundancy version, unlike DCI formats relating to downlink scheduling allocation since DCI format 0 uses synchronous HARQ. The carrier indicator is not included in DCI formats when cross-carrier scheduling is not used.

DCI format 4, which is a new format added to LTE-A Release 10, supports application of spatial multiplexing to uplink transmission in LTE-A. DCI format 4 has a larger message size than DCI format 0 since it further includes information for spatial multiplexing. DCI format 4 includes additional control information in addition to the control information included in DCI format 0. That is, DCI format 4 includes information on a modulation and coding scheme for the second transmission block, precoding information for multi-antenna transmission, and sounding reference signal (SRS) request information. DCI format 4 does not include an offset for differentiation between formats 0 and 1A as it has a larger size than DCI format 0.

DCI formats 1, 1A, 1B, 1C, 1D, 2, 2A, 2B and 2C for downlink scheduling allocation may be broadly divided into DCI formats 1, 1A, 1B, 1C and 1D, which do not support spatial multiplexing, and DCI formats 2, 2A, 2B and 2C, which support spatial multiplexing.

DCI format 1C supports only frequency contiguous allocation as compact frequency allocation, but includes neither a carrier indicator nor a redundancy version, compared to the other formats.

DCI format 1A is intended for downlink scheduling and random access. DCI format 1A may include a carrier indicator, an indicator for indicating whether or not downlink distributed transmission is used, PDSCH resource allocation information, a modulation and coding scheme, a redundancy version, a HARQ processor number for indicating a processor used for soft combining, a new data indicator used to empty a buffer to implement initial transmission in relation to a HARQ process, a TPC command for a PUCCH, and an uplink index necessary for TDD operation.

DCI format 1 includes control information similar to that of DCI format 1A. DCI format 1 supports non-contiguous resource allocation, whereas DCI format 1A is related to contiguous resource allocation. Accordingly, DCI format 1 further includes a resource allocation header, and thus slightly increases control signaling overhead as a trade-off for increase in flexibility of resource allocation.

Both DCI formats 1B and 1D further include precoding information, compared to DCI format 1. DCI format 1B includes PMI acknowledgement, and DCI format 1D includes downlink power offset information. Most control information included in DCI formats 1B and 1D corresponds to that of DCI format 1A.

DCI formats 2, 2A, 2B and 2C basically include most of the control information included in DCI format 1A and further include information for spatial multiplexing. In this embodiment, the information for spatial multiplexing corresponds to a modulation and coding scheme for the second transmission block, a new data indicator, and a redundancy version.

DCI format 2 supports closed loop spatial multiplexing, and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C, which may be regarded as an extended version of DCI format 2B, supports spatial multiplexing for up to 8 layers.

DCI formats 3 and 3A may be used to complement the TPC information included in the aforementioned DCI formats for uplink grant and downlink scheduling allocation, namely, to support semi-persistent scheduling. A 1-bit command is used per UE in the case of DCI format 3, and a 2-bit command is used per UE in the case of DCI format 3A.

One of the DCI formats described above is transmitted over a PDCCH, and a plurality of PDCCHs may be transmitted in the control region. A UE may monitor the plurality of PDCCHs.

PDCCH Processing

Control channel elements (CCEs), which are contiguous logical allocation units, are used in mapping a PDCCH to REs. A CCE includes a plurality of resource element groups (e.g., 9 REGs). Each REG includes four REs which may neighbor each other if the RS is excluded.

The number of CCEs necessary for a specific PDCCH depends on a DCI payload corresponding to the size of control information, a cell bandwidth, a channel coding rate, etc. Specifically, the number of CCEs for a specific PDCCH may be defined according to PDCCH formats as shown in Table 1.

TABLE 1

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

As described above, one of the four formats may be used for a PDCCH, but this is not known to the UE. Accordingly, the UE needs to perform decoding without knowing the PDCCH format. This is called blind decoding. Since decoding as many CCEs used for downlink as possible for each PDCCH format causes significant load to the UE, a search space is defined in consideration of restriction on the scheduler and the number of attempts to perform decoding.

That is, the search space is a set of candidate PDCCHs composed of CCEs which the UE needs to attempt to decode at an aggregation level. Each aggregation level and the corresponding number of candidate PDCCHs may be defined as shown in Table 2.

TABLE 2

| | Search space | | Number of PDCCH candidates |
|---|---|---|---|
| | Aggregation level | Size (in CCE units) | |
| UE-specific | 1 | 6 | 6 |
| | 2 | 12 | 6 |

TABLE 2-continued

| | Search space | | Number of |
|---|---|---|---|
| | Aggregation level | Size (in CCE units) | PDCCH candidates |
| | 4 | 8 | 2 |
| | 8 | 16 | 2 |
| Common | 4 | 16 | 4 |
| | 8 | 16 | 2 |

As shown in Table 2, there are 4 aggregation levels, and the UE has a plurality of search spaces according to the aggregation levels. The search spaces may be divided into a UE-specific search space (USS) and a common search space (CSS), as shown in Table 2. The UE-specific search space is for specific UEs. Each UE may check an RNTI and CRC with which the PDCCH is masked, by monitoring the UE-specific search space thereof (attempting to decode a PDCCH candidate set according to a possible DCI format) and acquire control information if the RNTI and CRC are valid.

The CSS is intended for use in the case in which a plurality of UEs or all UEs need to receive PDCCHs, as in the cases of system information dynamic scheduling and paging messages. The CSS may be used for a specific UE in terms of resource management. Furthermore, the CSS may overlap the USS.

Specifically, the search space may be determined by Equation 1 given below.

$$L\{(Y_k+m') \bmod \lfloor N_{CCE,k}/L \rfloor\}+i \qquad \text{Equation 1}$$

Here, L denotes an aggregation level, $Y_k$ is a variable determined by an RNTI and subframe number k, and m' is the number of PDCCH candidates. If carrier aggregation is applied, $m'=m+M^{(L)} \cdot n_{CI}$ and otherwise, $m'=m$. Herein, $M^{(L)}$ is the number of PDCCH candidates. $N_{CCE,k}$ is the total number of CCEs in the control region of a k-th subframe, and i is a factor indicating an individual CCE in each PDCCH candidate and is set as i=0, 1, . . . , L−1. For the CSS, $Y_k$ is always 0.

FIGS. 5(a)-5(d) show USSs (shaded portions) at respective aggregation levels which may be defined according to Equation 1. Carrier aggregation is not used, and $N_{CCE,k}$ is set to 32 for simplicity of illustration.

Figure 5:
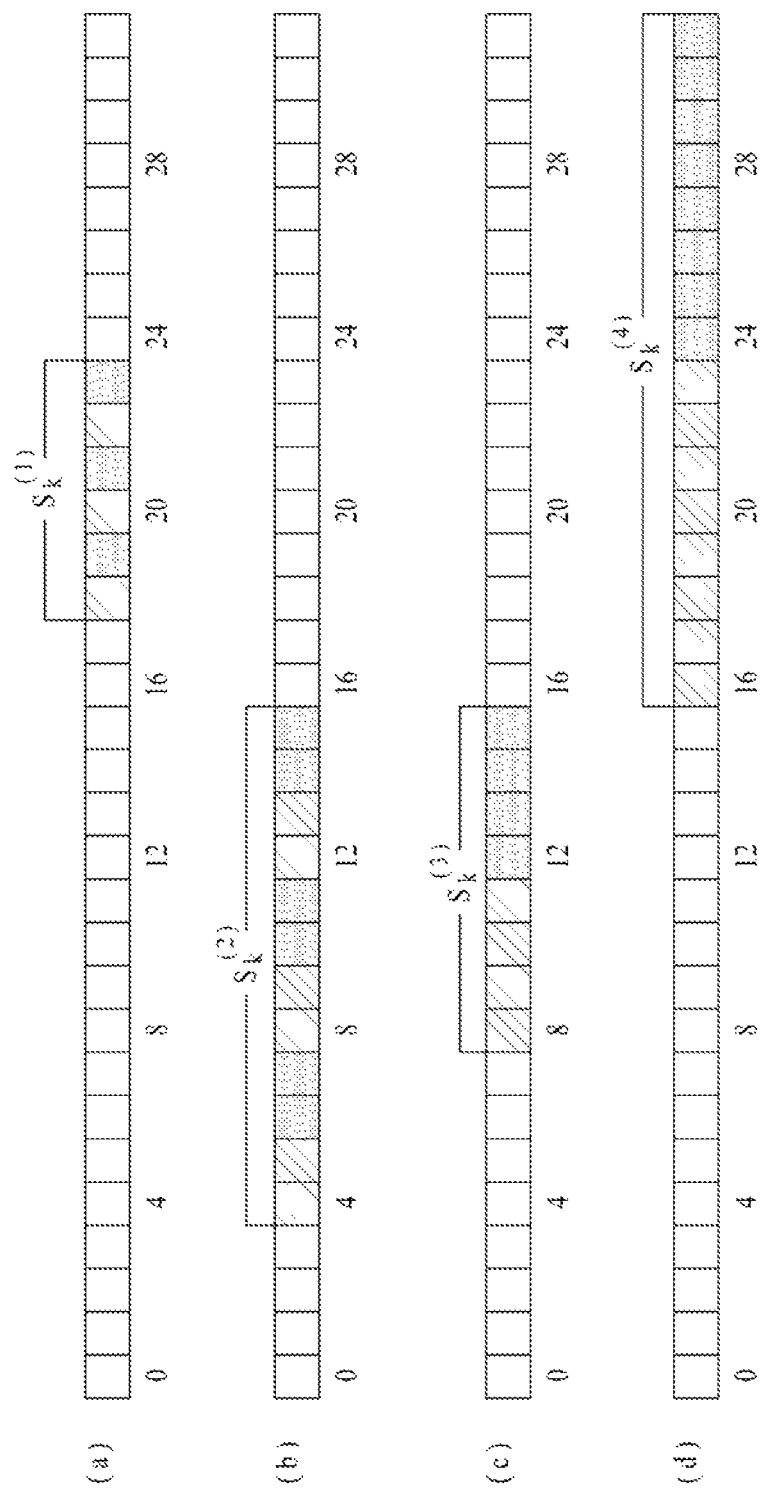
FIG. 5 including (a)-(d) illustrates a search space.

FIGS. 5(a), 5(b), 5(c) and 5(d) illustrate the cases of aggregation levels 1, 2, 4 and 8, respectively. The numbers represent CCE numbers. In FIG. 5 (a-d), the start CCE of a search space at each aggregation level is determined based on an RNTI and subframe number k. This CCE may be differently determined for a UE at the respective aggregation levels in the same subframe according to the modulo function and L. The start CCE is always determined to correspond to a multiple of the corresponding aggregation level due to L. In the description given below, $Y_k$ is exemplarily assumed to be CCE number 18. The UE attempts to sequentially decode the CCEs starting with the start CCE in units of CCEs determined for a corresponding aggregation level. In FIG. 5(b), for example, The UE attempts to decode the CCEs two by two, starting with CCE 4, which is the start CCE, according to the aggregation level.

In this manner, the UE attempts to perform decoding in a search space. The number of decoding attempts is determined by a DCI format and a transmission mode determined through radio resource control (RRC) signaling. If carrier aggregation is not applied, the UE needs to attempt to perform decoding up to 12 times in the CSS, in consideration of two DCI sizes (DCI formats 0/1A/3/3A and DCI format 1C) for each of six PDCCH candidates. In the USS, the UE needs to attempt to perform decoding up to 32 times, in consideration of two DCI sizes for each of 16 (6+6+2+2=16) PDCCH candidates. Accordingly, when carrier aggregation is not applied, the UE needs to attempt to perform decoding up to 44 times.

On the other hand, if carrier aggregation is applied, the maximum number of decodings increases because as many decodings for a USS and DCI format 4 as the number of DL resources (DL component carriers) are added.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the extent of distortion of the signal received over the channel is mainly used to detect the channel information. This signal is referred to as a pilot signal or a reference signal.

In the case in which data is transmitted and received using multiple antennas, a channel state between a transmit antenna and a receive antenna needs to be recognized to receive a correct signal. Accordingly, a separate RS is needed for each transmit antenna, more specifically, for each antenna port.

RSs may be divided into a UL RS and a DL RS. In the current LTE system, the UL RSs include:

i) a demodulation-reference signal (DM-RS) for channel estimation for coherent demodulation of information transmitted over a PUSCH and a PUCCH, and ii) a sounding reference signal (SRS) allowing the BS to measure UL channel quality at frequencies for different networks.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MBSFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for two purposes of acquisition of channel information and data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

FIGS. 6(a) and 6(b) are diagrams illustrating a pattern in which CRSs and DRSs defined in legacy 3GPP LTE (e.g., Release-8) are mapped to resource block (RB) pairs. A downlink RB pair, a unit in which an RS is mapped, may be represented as a unit of one subframe in the time domain times 12 subcarriers in the frequency domain. That is, one RB pair has a length of 14 OFDM symbols for a normal CP (FIG. 6(a)) and a length of 12 OFDM symbols for an extended CP (FIG. 6(b)).

FIGS. 6(a) and 6(b) show locations of RSs on RB pairs in a system with a BS supporting four transmit antennas. In FIGS. 6(a) and 6(b), resource elements (REs) marked "0", "1", "2" and "3" represent the locations of the CRSs for antenna port indexes 0, 1, 2 and 3, respectively. In FIGS. 6(a) and 6(b), REs denoted by "D" represent locations of the DMRSs.

Heterogeneous Deployments

Figure 7:
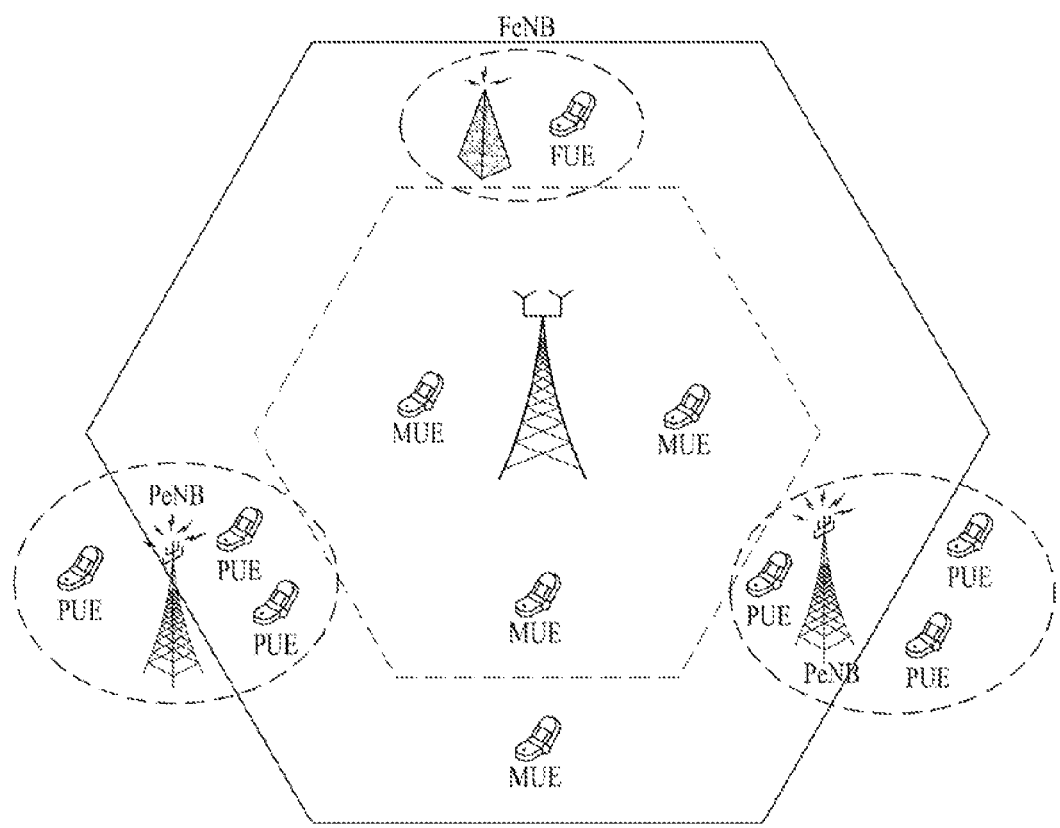
FIG. 7 is a diagram illustrating heterogeneous deployments.

FIG. 7 illustrates a heterogeneous network wireless communication system including a macro eNB (MeNB) and micro eNBs (PeNBs or FeNBs). The term "heterogeneous network" employed in this specification refers to a network in which an MeNB and a PeNB or FeNB coexist while they use the same radio access technology (RAT).

The MeNB is a normal eNB of a wireless communication system having wide coverage and high transmit power. The MeNB may be referred to as a macro cell.

The PeNB or FeNB may be referred to as, for example, a micro cell, pico cell, femto cell, home eNB (HeNB), relay, etc. (The exemplified PeNB or FeNB and MeNB may be collectively referred to as transmission points (TPs)). The PeNB or FeNB, a micro version of the MeNB, can independently operate while performing most functions of the MeNB. The PeNB or FeNB is a non-overlay type eNB that may be overlaid in an area covered by the MeNB or in a shadow area that is not covered by the MeNB. The PeNB or FeNB may cover a smaller number of UEs while having narrower coverage and lower transmit power than the MeNB.

A UE (hereinafter, referred to as a macro-UE) may be directly served by the MeNB, or a UE (hereinafter, referred to as a micro-UE) may be served by the PeNB or FeNB. In some cases, a PUE present in the coverage of the MeNB may be served by the MeNB.

PeNBs or FeNBs may be classified into two types according to whether or not UE access is limited.

The first type is an open access subscriber group (OSG) or non-closed access subscriber group (non-CSG) eNB and corresponds to a cell that allows access of the existing MUE or a PUE of a different PeNB. The existing MUE can handover to the OSG type eNB.

The second type is a CSG eNB which does not allow access of the existing MUE or a PUE of a different PeNB. Accordingly, handover to the CSG eNB is impossible.

Coordinated Multi-Point (CoMP)

To satisfy requirements for enhanced system performance of the 3GPP LTE-A system, CoMP transmission and reception technology (also called co-MIMO, collaborative MIMO or network MIMO) has been proposed. CoMP technology may increase the performance of UEs located at a cell edge and the average sector throughput.

In a multi-cell environment with a frequency reuse factor of 1, the performance of a UE located at a cell edge and the average sector throughput may be lowered due to inter-cell interference (ICI). To attenuate ICI, the legacy LTE/LTE-A system has adopted a simple passive technique such as fractional frequency reuse (FFR) based on UE-specific power control such that a UE located at a cell edge may have appropriate throughput performance in an environment constrained by interference. However, attenuating the ICI or reusing ICI as a desired signal for the UE may be more preferable than lowering use of frequency resources per cell. To this end, a CoMP transmission technique may be employed.

CoMP schemes applicable to downlink may be broadly classified into joint processing (JP) and coordinated scheduling/beamforming (CS/CB).

According to the JP scheme, data can be used by each transmission point (eNB) of a CoMP cooperation unit. The CoMP cooperation unit refers to a set of eNBs used for a CoMP transmission scheme. The JP scheme may be further divided into joint transmission and dynamic cell selection.

Joint transmission refers to a technique of simultaneously transmitting PDSCHs from a plurality of transmission points (a part or the entirety of a CoMP cooperation unit). That is, a plurality of transmission points may simultaneously transmit data to a single UE. With the joint transmission scheme, the quality of a received signal may be coherently or non-coherently improved, and interference with other UEs may be actively eliminated.

Dynamic cell selection is a technique of transmitting a PDSCH from one transmission point (of a CoMP cooperation unit) at a time. That is, one transmission point transmits data to a single UE at a given time, while the other transmission points in the CoMP cooperation unit do not transmit data to the UE at the time. A transmission point to transmit data to a UE may be dynamically selected.

Meanwhile, in the CS/CB scheme, CoMP cooperation units may cooperatively perform beamforming for data transmission to a single UE. Herein, user scheduling/beamforming may be determined through coordination among cells of a CoMP cooperation unit, whereas data is transmitted to the UE only from a serving cell.

In the case of uplink, CoMP reception refers to reception of a signal transmitted through cooperation among a plurality of geographically separated transmission points. CoMP schemes applicable to uplink may be classified into joint reception (JR) and coordinated scheduling/beamforming (CS/CB).

The JR scheme indicates that a plurality of reception points receives a signal transmitted through a PUSCH. The CS/CB scheme indicates that only one point receives a PUSCH, and user scheduling/beamforming is determined by coordination among the cells of a CoMP unit.

With the CoMP system as above, multi-cell base stations may jointly support data for a UE. In addition, the base stations may simultaneously support one or more UEs using the same radio frequency resources, thereby increasing system performance. Moreover, a base station may perform space division multiple access (SDMA) based on CSI between the UE and the base station.

In the CoMP system, a serving eNB and one or more cooperative eNBs are connected to a scheduler over a backbone network. The scheduler may receive channel information about the channel states between each UE and cooperative eNBs measured and fed back by the cooperative eNBs over the backbone network, and operate based on the channel information. For example, the scheduler may schedule information for a cooperative MIMO operation for the serving eNB and the one or more cooperative eNBs. That is, the scheduler may directly issue a command about the cooperative MIMO operation to each eNB.

As described above, the CoMP system may be viewed as operating as a virtual MIMO system formed by grouping a plurality of cells into one group. Basically, the CoMP system may adopt a MIMO communication scheme employing multiple antennas.

Figure 8:
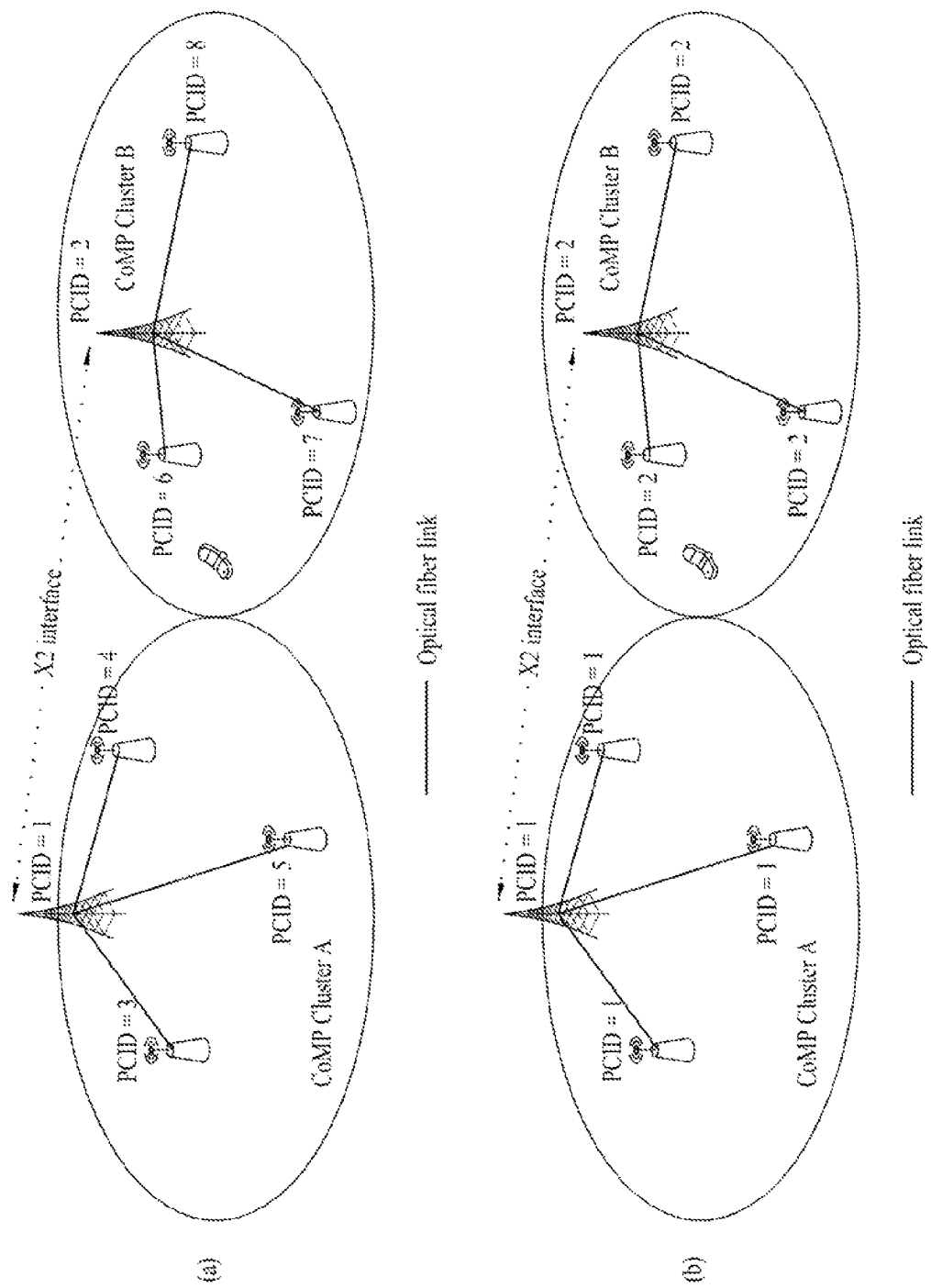
FIG. 8 including (a)-(d) is a diagram illustrating a coordinated multi-point (CoMP) cluster.

FIGS. 8(a)-8(d) illustrate a CoMP cluster. A CoMP cluster refers to a CoMP cooperation unit mentioned above. FIG. 8(a) illustrates a case in which the cells in a CoMP cluster use different physical cell IDs (PCIDs), and FIG. 8(b) illustrates a case in which the cells in a CoMP cluster use the same PCID. Even if the cells use the same PCID in a CoMP cluster, the CoMP clusters (CoMP clusters A and B in FIG. 8(b)) may use different PCIDs, and the cells in a single cluster may be configured in the form of distributed antennas or RRHs of a single eNB by sharing a PCID. In a variation, some of the cells in a cluster may share a PCID.

If the cells share a PCID, all the cells having the same PCID may transmit a common signal such as a primary synchronization signal (PSS)/secondary synchronization signal (SSS), a CRS, a PBCH, or a CRS-based PDCCH/PDSCH at the same time, thereby improving quality of received signals and removing the communication shadow area. Alternatively, some of the cells having the same PCID may transmit a common signal with higher transmit power, and the other cells may not transmit the common signal. However, in the case of unicast data transmission through a CSI-RS, a UE-specific RS and a UE-specific RS-based PDSCH, each cell may individually perform transmission and have a cell splitting gain.

Enhanced-PDCCH (EPDCCH)

In LTE after Release 11, an enhanced-PDCCH (EPDCCH) which can be transmitted through the existing PDSCH region is considered as a solution to lack of capacity of a PDCCH caused by coordinated multi-point (CoMP), multi user-multiple input multiple output (MU-MIMO), and the like and degradation of PDCCH performance caused by inter-cell interference. In addition, in the case of EPDCCH, channel estimation may be performed based on DMRSs in order to obtain a pre-coding gain, unlike the case of the existing CRS-based PDCCH.

EPDCCH transmission may be divided into localized EPDCCH transmission and distributed EPDCCH transmission according to configuration of a PRB pair used for EPDCCH transmission. Localized EPDCCH transmission represents a case in which resource sets used for transmission of an EPDCCH neighbor each other in the frequency domain, and precoding may be applied to obtain a beam-forming gain. For example, localized EPDCCH transmission may be based on consecutive ECCEs the number of which corresponds to an aggregation level. On the other hand, distributed EPDCCH transmission represents transmission of an EPDCCH in a separated PRB pair in the frequency domain, and has a gain in terms of frequency diversity. For example, distributed EPDCCH transmission may be based on the ECCE having four EREGs included in each PRB pair separated in the frequency domain.

A UE may perform blind decoding similar to the blind decoding performed in the legacy LTE/LTE-A system, in order to receive/acquire DCI through an EPDCCH. More specifically, the UE may attempt to perform decoding for (or monitor) a set of EPDCCH candidates according to each aggregation level to obtain DCI formats corresponding to a set transmission mode. Herein, the set of EPDCCH candidates to be monitored may be referred to as an EPDCCH USS. This search space may be configured/constructed according to each aggregation level. In addition, aggregation levels 1, 2, 4, 8, 16 and 32, which are more or less different from the aggregation levels for the legacy LTE/LTE-A system, are available according to the subframe type, the CP length, the quantity of resources available in a PRB pair, and the like.

For a UE for which an EPDCCH is configured, REs included in a PRB pair set are indexed to EREGs, and each EREG is indexed on an ECCE-by-ECCE basis. Control information may be received by determining EPDCCH candidates constituting a search space based on the indexed ECCEs and then performing blind decoding.

Here, EREG and ECCE respectively correspond to REG and CCE in the conventional LTE/LTE-A. One PRB pair may include 16 EREGs. However, if one PRB pair is invariably set to have 16 EREGs, a problem related to coding rate may occur when the number of REs available for EPDCCH transmission decreases. For example, when the number of REs for EPDCCH in a PRB pair decreases as in the case of TDD special subframe configurations and extended CPs, the number of REs used for EPDCCH among the REs included in the EREG may decrease. The aggregation level may be increased to solve such problem, but this is not a perfect solution. Hereinafter, description will be given of a method for determining the number of EREGs per PRB pair and the number of ECCEs per PRB pair according to embodiments of the present invention, which are intended to actively cope with such situation as described above.

Embodiment 1

This embodiment assumes that the size of EREG is fixed. The fixed size of EREG may be predetermined or delivered to the UE through higher layer signaling.

As the size of EREG is fixed, the number of EREGs per PRB pair depends on the number of REs available for EPDCCH, and may be represented by Equation 2 given below.

$$n = \left\lfloor \frac{\text{the number of available } REs}{\text{the size of } EREG} \right\rfloor \quad \text{Equation 2}$$

In Equation 2, the size of EREG denotes the fixed EREG size, the number of available REs denotes the number of available REs in the PRB pair, and n denotes the number of EREGs per PRB pair.

The available REs in the PRB pair imply that they can be used only for EPDCCH transmission and not for signals for other uses (e.g., control channel, CRS, DMRS, CSI-RS, PBCH, PSS/SSS, etc.). The number of available REs may be recognized by the UE through system information, a control signal, or the like. Alternatively, UE may receive the type of a signal and information related to transmission of the signal which should be considered to calculate the number of REs available through signaling or the number of available REs.

Once 'n', the number of EREGs per PRB pair, is determined, the UE may determine 'm', the number of ECCEs per PRB pair. That is, the UE may find the number of ECCEs per PRB pair using the number of EREGs per PRB pair 'n' and the number of EREGs per ECCE. Here, the number of EREGs per ECCE may be predetermined or received through higher layer signaling.

In the above description, REs (including EREGs not included in the ECCEs) other than the EREG determined by Equation 2 may be uniformly distributed to EREGs and used to increase the coding gain or may be excluded from EPDCCH transmission. The transmit power of the REs excluded from EPDCCH transmission may be used for power boosting/borrowing for an EREG.

for EPDCCH in the subframe. For example, the network and the UE may determine to use 16 EREGs per PRB pair in a normal subframe and 8 EREGs per PRB pair in a special subframe.

Particularly, in the case of the TDD special subframe, the number of EREGs per PRB pair, n, may be determined according to the special subframe configuration.

TABLE 3

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | $2192 \cdot T_s$ | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | | $5120 \cdot T_s$ | $20480 \cdot T_s$ | | |
| 6 | $19760 \cdot T_s$ | $4384 \cdot T_s$ | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 9:
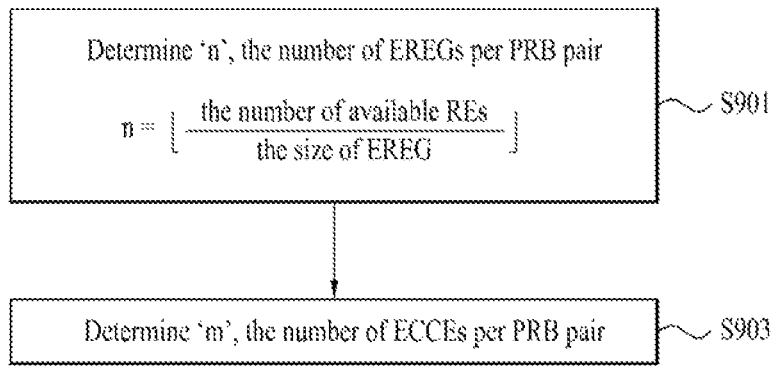
FIGS. 9 and 10 illustrate a method for determining the number of EREGs per PRB and the number of ECCEs per PRB according to embodiments of the present invention.

FIG. 9 is a flowchart illustrating the process of determining the number of EREGs per PRB pair and the number of ECCEs per PRB pair according to Embodiment 1.

A UE set to receive control information over an EPDCCH may determine 'n', the number of EREGs per PRB pair, in step S901 in order to perform blind decoding. Then, 'm', the number of ECCEs per PRB pair, may be found using the result of step S901 and the number of EREGs per ECCE in step S903. These steps are performed as previously described and thus a detailed description thereof will be omitted.

Embodiment 2

Unlike the previous embodiment, this embodiment is about a case in which the size of EREG is variable. The method for determining the number of EREGs per PRB pair 'n' and the number of ECCEs per PRB pair 'm' according to Embodiment 2 can be described by the flowchart of FIG. 10.

Figure 10:
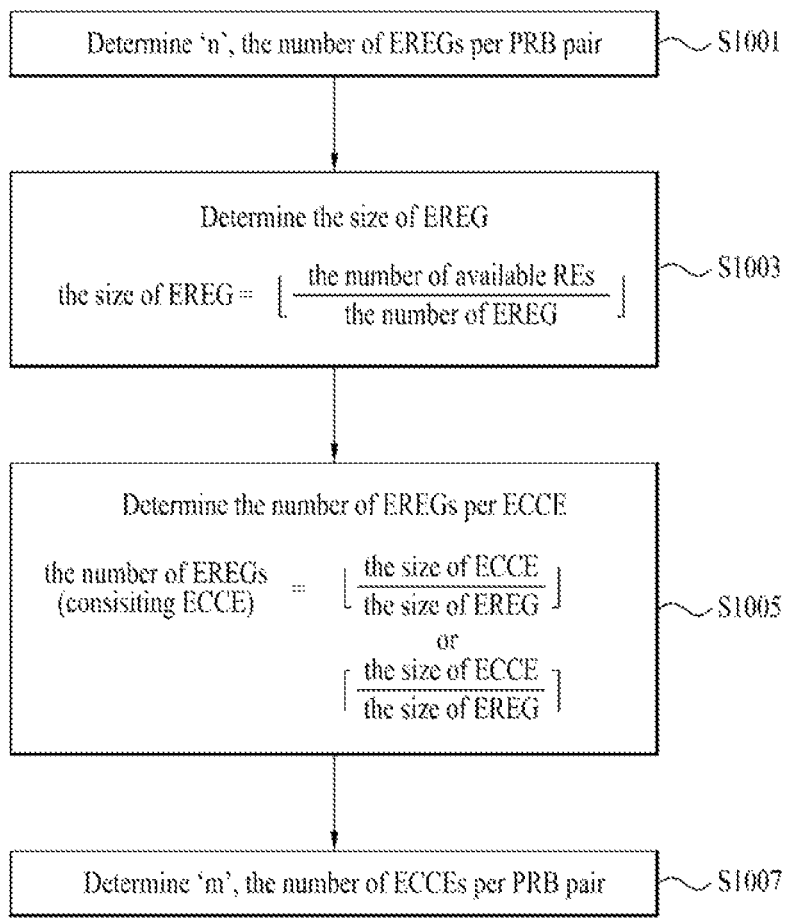

Referring to FIG. 10, a UE may determine the number of EREGs per PRB pair 'n' according to the subframe structure and/or the carrier type in step S1001. In step S1003, the UE may determine the size of EREG using the number of EREGs per PRB pair 'n' and the number of available REs. Once the size of EREG is determined the UE may determine the number of EREGs per ECCE using the sizes of EREG and ECCE. Here, the number of EREGs per ECCE may be predetermined or received through higher layer signaling. In this case, step S1005 may be omitted. The UE may determine 'm', the number of ECCEs per PRB pair, using the number of EREGs per ECCE and the number of EREGs per PRB pair in step S1007.

Hereinafter, each of the above steps will be described in more detail.

In step S1001, 'n', the number of EREGs per PRB pair, may be determined according to the subframe structure and/or the carrier type. Since the number of resources in a PRB pair varied depending on the subframe structure, the number of EREGs per PRB pair can be expected to be determined according to the number of resources available Referring to the special subframe configurations shown in Table 3, the number of OFDM symbols that can be used for downlink transmission may be 3, 9, 10, 11, or 13, and the number of EREGs per PRB pair may be correspondingly determined according to the number. For example, in the case of special subframe configurations 0 and 5, three OFDM symbols are set as a DwPTS, and therefore it may be determined that there is no EPDCCH transmission for these configurations. In the case of special subframe configurations 1, 2, 6 and 7, the number of OFDM symbols usable for downlink transmission are 9, 10, 9, and 10 respectively, and therefore the number of EREGs per PRB pair 'n' may be determined to be 4. In the case of special subframe configurations 3, 4 and 8, the number of EREGs per PRB pair 'n' may be determined to be 8.

The number of EREGs per PRB pair may be determined according to the carrier type in addition to/separately from the subframe structure as described above. For example, in the case of a new carrier type (NCT) for which PDCCH transmission may not be performed, when special subframe configuration 4 (DwPTS: 12 OFDM symbols) is applied, quantities of resources corresponding to 2 OFDMs assigned to a normal carrier as a control region may be secured in terms of the number of available OFDM symbols. Accordingly, in the case of an NCT with special subframe configuration 4, 16 EREG per PRB pair may be assumed. In the case of special subframe configurations 0 and 5, the number of OFDM symbols that can be used for downlink transmission is 3. However, a PDCCH may be transmitted in the NCT, and thus the number of EREGs per PRB pair may be determined to be 4 or 2. In the case of special subframe configurations 1, 2, 3, 4, 6, 7 and 8, the number of EREGs per PRB pair may be determined to be 16. It may be assumed that the special subframe configurations for the NCT other than special subframe configurations 0 and 5 have the same the number of EREGs per PRB pair or the number of ECCEs per PRB pair.

Further, the number of EREGs per PRB pair may be determined depending on whether the normal CP is used or the extended CP is used.

In step S1003, the size of EREG may be determined based on the number of EREGs per PRB pair 'n' and the number of REs available for EPDCCH. This may be represented by Equation 3 given below.

$$\text{the size of } EREG = \left\lfloor \frac{\text{the number of available } REs}{\text{the number of } EREG} \right\rfloor \qquad \text{Equation 3}$$

In this equation, the number of EREGs is 'n', as discussed above, and the number of available REs is the number of REs available for the PRB pair. The number of REs available for the PRB pair may be determined in consideration of resources unusable for EPDCCH transmission, for example, REs used for transmission of a control signal/region, DMRS, CSI-RS, CRS, PBCH, and PSS/SSS.

In step S1005, the number of EREGs per ECCE may be determined by Equation 4 given below.

$$\text{the number of } EREGs \text{ (consisiting } ECCE) = \left\lfloor \frac{\text{the size of } ECCE}{\text{the size of } EREG} \right\rfloor \text{ or } \left\lceil \frac{\text{the size of } ECCE}{\text{the size of } EREG} \right\rceil \qquad \text{Equation 4}$$

In this equation, the size of ECCE may be predetermined or received through higher layer signaling. This equation suggests that the coding rate of an ECCE is set to be high/low if the size of ECCE is not an integer multiple of the size of EREG.

When the number of EREGs per PRB pair is found according to the subframe structure, i.e., a special subframe configuration in step S1001, the EREG size determined in step S1003 and the number of EREGs per ECCE determined in step S1005 may change according to overhead (e.g., DMRS overhead) in the PRB pair. This may result in a variable number of ECCEs per PRB pair.

While both EREG and ECCE have been considered in the description given above, only ECCE may be considered for an embodiment. In view of the ECCE, it can be expected that the number of ECCEs in a PRB pair is determined according to the subframe structure and the carrier type and that aggregation levels except aggregation level 1 are subject to blind decoding in the descending order if the ECCE size determined by overhead in the PRB pair is not sufficient for transmission of DCI. When needed, blind decoding for aggregation levels 1, 2, 4 and 8 may be replaced with blind decoding for aggregation levels 2, 4, 8 and 16, which may be interpreted as configuring candidates of a higher level (e.g., aggregation level 2) to obtain the coding rate of a lower aggregation level (e.g., aggregation level 1).

Figure 11:
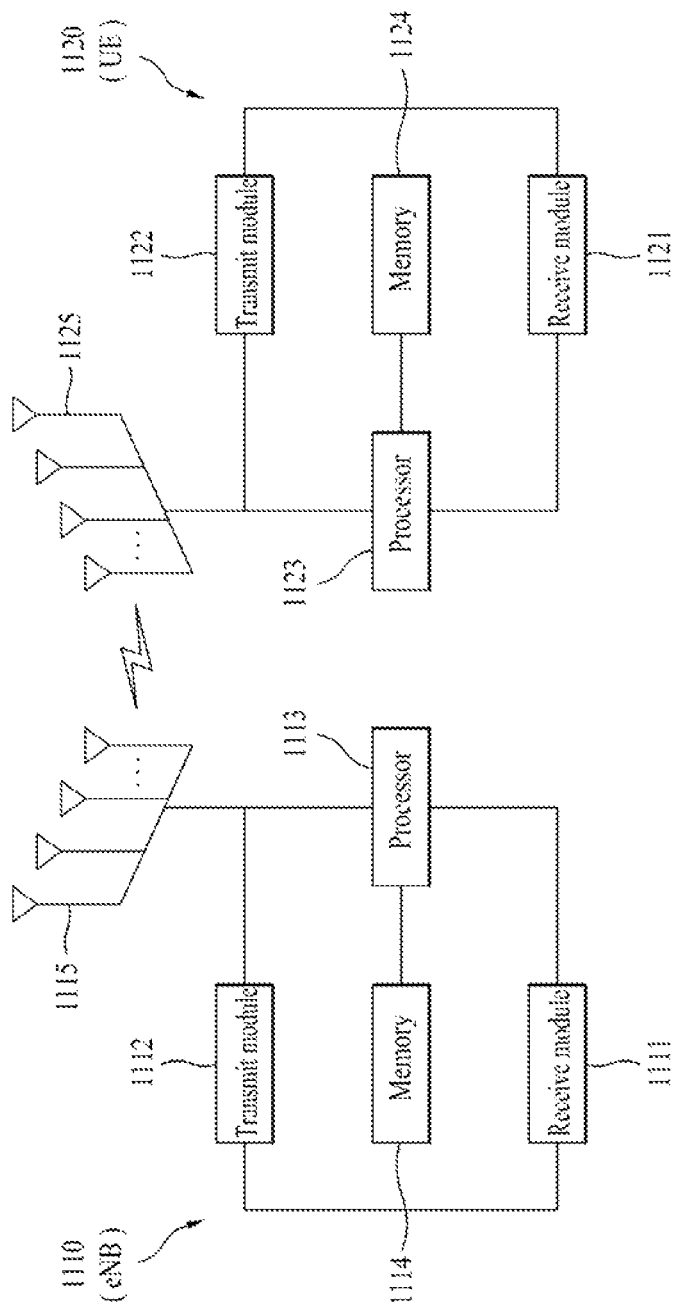
FIG. 11 is a diagram illustrating configuration of transceivers.

FIG. 11 is a diagram illustrating configurations of a transmission point and a UE according to one embodiment of the present invention.

Referring to FIG. 11 a transmission point 1110 may include a receive module 1111, a transmit module 1112, a processor 1113, a memory 1114, and a plurality of antennas 1115. The antennas 1115 represent a transmission point that supports MIMO transmission and reception. The receive module 1111 may receive various signals, data and information from a UE on uplink. The transmit module 1112 may transmit various signals, data and information to a UE on downlink. The processor 1113 may control overall operation of the transmission point 1110.

The processor 1113 of the transmission point 1110 according to one embodiment of the present invention may perform operations necessary for the embodiments described above.

Additionally, the processor 1113 of the transmission point 1110 may function to computationally process information received by the transmission point 1110 or information to be transmitted to the outside, etc. The memory 1114, which may be replaced with an element such as a buffer (not shown), may store the computationally processed information for a predetermined time.

Referring to FIG. 11, a UE 1120 may include a receive module 1121, a transmit module 1122, a processor 1123, a memory 1124, and a plurality of antennas 1125. The antennas 1125 mean that the UE supports MIMO transmission and reception. The receive module 1121 may receive various signals, data and information from an eNB on downlink. The transmit module 1122 may transmit various signals, data and information to the eNB on uplink. The processor 1123 may control overall operation of the UE 1120.

The processor 1123 of the UE 1120 according to one embodiment of the present invention may perform operations necessary for the embodiments described above.

Additionally, the processor 1123 may function to computationally process information received by the UE 1120 or information to be transmitted to the outside, and the memory 1124, which may be replaced with an element such as a buffer (not shown), may store the computationally processed information for a predetermined time.

The configurations of the transmission point and the UE as described above may be implemented such that the above-described embodiments are independently applied or two or more thereof are simultaneously applied, and description of redundant parts is omitted for clarity.

Description of the transmission point 1110 in FIG. 11 may also be applied to a relay which serves as a downlink transmitter or an uplink receiver, and description of the UE 1120 may be equally applied to a relay which serves as a downlink receiver or an uplink transmitter.

The embodiments of the present invention may be implemented through various means, for example, hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

The embodiments of the present invention as described above are applicable to various mobile communication systems.

The invention claimed is:

1. A method for receiving control information through an enhanced physical downlink control channel (EPDCCH) at a user equipment (UE) in a wireless communication system, the method comprising:
    indexing, by the UE, resource elements (REs) included in a physical resource block (PRB) set of a received subframe with 'n' enhanced resource element groups (EREGs) per PRB pair;
    indexing, by the UE, the 'n' EREGs to 'm' enhanced control channel elements (ECCEs) per PRB pair; and
    determining, by the UE, an EPDCCH candidate constituting a UE-specific search space based on the 'm' ECCEs and performing blind decoding,
    wherein when a size of an EREG is fixed, 'n' is determined based on a number of REs available for a PRB pair and the size of the EREG, and
    wherein 'm' is determined by 'n' and a number of EREGs per ECCE.

2. The method according to claim 1, wherein the number of EREGs per ECCE is predetermined or indicated through higher layer signaling.

3. The method according to claim 1, wherein 'n' is determined by a following equation:

$$n = \left\lfloor \frac{\text{the number of available } REs}{\text{the size of } EREG} \right\rfloor,$$

wherein the size of EREG is the fixed size of the EREG, and the number of available REs is the number of REs available for the PRB pair.

4. The method according to claim 1, wherein the number of REs available for the PRB pair is the number of REs usable for EPDCCH transmission.

5. The method according to claim 1, wherein REs not corresponding to the EREGs are used for transmit power boosting for the EREGs.

6. The method according to claim 1, wherein, when a size of the EREG is variable, the number of EREGs per PRB pair 'n' is determined according to a subframe structure.

7. The method according to claim 6, wherein the size of the EREG is determined by the number of REs available for the PRB pair and 'n'.

8. The method according to claim 6, wherein the size of the EREG is used to determine the number of EREGs per ECCE.

9. The method according to claim 6, wherein the size of EREG is determined by a following equation:

$$\text{the size of } EREG = \left\lfloor \frac{\text{the number of available } REs}{\text{the number of } EREG} \right\rfloor,$$

wherein the size of EREG is 'n', and the number of available REs is the number of REs available for the PRB pair.

10. The method according to claim 6, wherein the number of ECCEs per PRB pair 'm' is determined by 'n' and the number of EREGs per ECCE.

11. The method according to claim 6, wherein the subframe structure is distinguished according to a special subframe configuration.

12. A user equipment (UE) in a wireless communication system, the UE comprising:
    a receiver configured to receive a subframe; and
    a processor configured to control the receiver,
    wherein the processor is configured to:
    index resource elements (REs) included in a physical resource block (PRB) set of the subframe received by the receiver with 'n' enhanced resource element groups (EREGs) per PRB pair,
    index the 'n' EREGs to 'm' enhanced control channel elements (ECCEs) per PRB pair, and
    determine an enhanced physical downlink control channel (EPDCCH) candidate constituting a UE-specific search space based on the 'm' ECCEs and perform blind decoding,
    wherein when a size of an EREG is fixed, 'n' is determined based on a number of REs available for a PRB pair and the size of the EREG, and
    wherein 'm' is determined by 'n' and the number of EREGs per ECCE.

* * * * *